Figure 1:
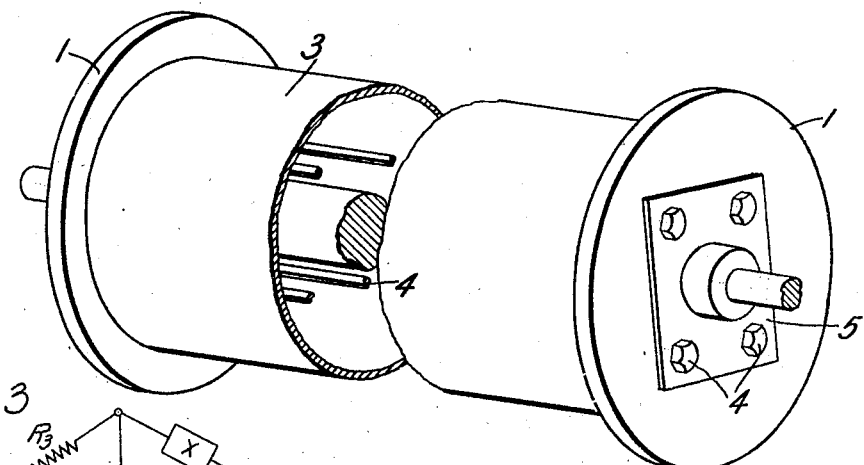
Figure 1:
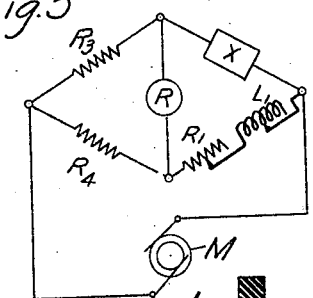

Jan. 29, 1929.                                                    1,700,444
                        W. E. MOUGEY
        METHOD OF AND APPARATUS FOR MEASURING THE
             INDUCTANCE OF CABLES AND CONDUCTORS
                       Filed Aug. 17, 1926

Inventor:
Wilbur E. Mougey
by E. W. Griggs, Attorney

Patented Jan. 29, 1929.

1,700,444

UNITED STATES PATENT OFFICE.

WILBUR EUGENE MOUGEY, OF ALDWYCH, LONDON, ENGLAND, ASSIGNOR TO WESTERN ELECTRIC COMPANY, INCORPORATED, OF NEW YORK, N. Y., A CORPORATION OF NEW YORK.

METHOD OF AND APPARATUS FOR MEASURING THE INDUCTANCE OF CABLES AND CONDUCTORS.

Application filed August 17, 1926, Serial No. 129,856, and in Great Britain August 19, 1925.

This invention relates to methods of measuring the inductance of lengths of cable or conductor, and is particularly applicable to cable conductors of the continuously loaded type such for example as that in the loaded submarine telegraph cable described in the patent to Buckley, 1,586,875, June 1, 1926.

In measuring the inductance of a length of conductor, it is desirable to arrange the conductor in a compact form, so that the measurement may readily be made, for example, by means of an alternating current bridge. This has usually been done heretofore in the case of an insulated conductor, by folding the conductor into two equal and parallel parts joined together at one end by a loop. The double conductor is then wound on a drum or reel, with the parallel parts closely adjacent one to the other, thus forming what is termed as bifilar winding. With such an arrangement the inductance measured across the terminals of the conductor consists practically of that due to the magnetic loading material with which the conductor is loaded, the inductance due to the coiled conformation of the conductor being substantially neutralized by the bifilar winding.

In the case of an un-insulated conductor the same effect has been secured by permanently arranging a conductor to act as the return in an open helix upon a reel, the un-insulated conductor to be measured being then wound around the reel in the space between adjacent turns of the return conductor, but insulated therefrom. The conductor to be measured is then connected at one end to the return conductor, the two conductors thus forming a bifilar winding as described above.

If the length of conductor were wound continuously in one direction upon the reel, without being first arranged in the form of a bifilar winding, the self-inductance of the coil due to the coiling of the conductor would be so large relative to the inductance of the conductor due to the loading material, that it would be difficult or impossible to determine the latter inductance with any accuracy.

The method before referred to, of doubling the conductor into two parallel parts, is difficult and expensive, particularly when applied to a conductor of great length, and moreover, in the case of an un-insulated conductor the method of providing a return conductor in an open spiral necessitates, among other inconveniences, the provision of a large reel to hold in a single layer, twice the length of conductor it is desired to measure.

It is the object of this invention to provide an improved method of measuring the inductance of lengths of conductor, which will permit of the continuous winding of the conductor in one direction, without providing a parallel return conductor to make a bifilar winding.

According to the present invention the inductance of the conductor is increased by altering its conformation, and the added inductance is substantially neutralized by means of a second conductor insulated from the first, and not conductively connected thereto at any point. The conductor to be tested is preferably wound upon and insulated from a drum of conducting material which forms the second conductor and acts as the short circuited secondary winding of a transformer, the primary winding of which is formed by the conductor itself. In this case the primary and secondary windings may, if desired, be connected together at one point without affecting the results. The flux produced by the eddy currents induced in the drum when alternating current is passed through the conductor, provided the conductivity of the drum is sufficiently high, neutralizes the flux produced by the alternating current in the conductor, and the inductance measured across the terminals of the conductor is the inductance required.

When the inductance of an un-insulated conductor is to be measured, the drum is coated with insulating material, which is preferably provided with a helical groove for the purpose of insulating adjacent turns of the conductor from one another.

Figure 2:
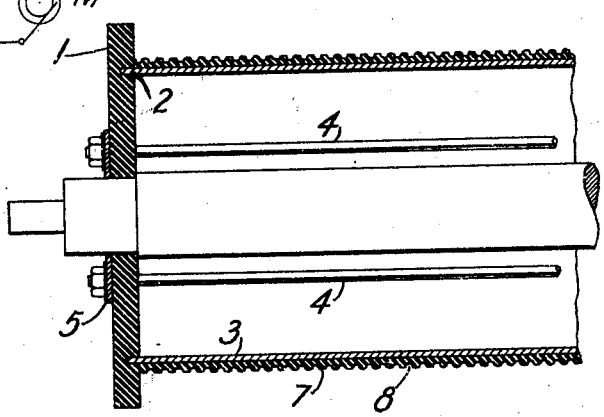

The invention is illustrated by way of example in the accompanying drawings, in which Figure 1 shows a drum suitable for use in the measurement of the inductance of insulated conductors, and Figure 2 shows a drum for use with un-insulated conductors. Fig. 3 shows a conventional alternating current bridge circuit for measuring inductance.

In the drawings, the two cheeks 1 of the drum are of wood, preferably internally reinforced with metal, and are provided with annular grooves 2 (see Fig. 2). A copper cylinder 3 is mounted between the two cheeks 1 with its ends resting in the annular grooves 2. The cheeks are clamped together by means of four bolts 4 which run the length of the drum and which bear upon metal plates 5. An internal wooden structure (not shown) may be provided to support the copper cylinder and to make the drum sufficiently robust. Any known or suitable means may be provided for mounting and rotating the drum.

Referring to Figure 1, the insulated conductor, the inductance of which is to be measured, is wound upon the drum, preferably in a single layer, and the inductance between its terminals will then be substantially the distributed inductance of the conductor itself, the inductance due to the coiling of the conductor being substantially neutralized by the copper cylinder 3 acting as the short circuited secondary winding of a transformer, the conductor itself acting as the primary winding. The walls of the copper cylinder may be made of such thickness that the losses therein are negligible and the flux generated by the eddy currents induced in the cylinder will then substantially neutralize the flux due to the primary winding.

Referring now to Figure 2, a layer of insulating material 7, is provided upon the outer surface of the copper cylinder 3 and this insulating layer is provided with a helical groove 8. Un-insulated conductor may be wound upon this drum and will be insulated from the copper cylinder, whilst the groove 7, if made of suitable shape and pitch, will keep adjacent turns from contacting with one another. As described in connection with Fig. 1, the inductance measured across the terminals of the conductor will be substantially that of the conductor itself, apart from its conformation.

Referring to Fig. 3 the resistances $R_3$ and $R_4$ form the ratio arms of a conventional Wheatstone bridge circuit. X is the conductor the inductance of which is to be measured, $R_1$ and $L_1$ are a calibrated variable resistance and inductance respectively, M is a source of alternating current for energizing the bridge and R is a detecting instrument with which to determine when the bridge is balanced. It is often convenient to make $R_3$ and $R_4$ equal to each other, and in that case, when the bridge is balanced $R_1$ and $L_1$ give directly the resistance and inductance of the conductor X.

If it is desired to measure the added inductance of a loaded conductor due substantially to the loading material, such for example as that described in the patent to Buckley 1,586,875, June 1, 1926, to a greater degree of accuracy than is possible with the methods described above, an un-loaded conductor, of substantially the same length and cross-sectional area may be wound upon the drum in place of the loaded conductor and the inductance then measured across its terminals will substantially equal the natural inductance of the conductor, plus the un-neutralized inductance due to coiling of the conductor. Since this conductor is un-loaded, if the value of the inductance measured be deducted from future measurements with loaded conductor, the resulting value will substantially represent the added inductance due to the loading material.

Suppose for example that the inductance of an un-loaded conductor wound upon the drum is found to be 20 milli-henrys and that of the loaded conductor 220 milli-henrys, then the inductance of the loaded conductor due to the loading material would be substantially equal to 200 milli-henrys. If however, the same two conductors were wound successively upon ordinary drums, the respective inductances might for example be 1020 and 1220 milli-henrys. It will be readily understood that inductances of such magnitude would swamp the small inductance which it is required to measure and the probable error would be greatly increased. There are many other ways in which the invention may be carried into effect without departing from the scope thereof as defined in the appended claims.

What is claimed is:

1. The method of measuring the distributed inductance of a continuously loaded conductor that is in such a form as to produce, in addition to the magnetic flux due to its distributed inductance, a flux common to more than one portion of said conductor, which comprises providing a substantially equal and opposite flux to neutralize said additional flux, and measuring the total effective remaining inductance of the conductor.

2. A method as claimed in claim 1 in which the substantially equal and opposite flux is produced by the flux it is intended to neutralize.

3. An apparatus for measuring the distributed inductance of a continuously loaded, coiled conductor which possesses additional inductance due solely to its configuration, comprising a second conductor insulated from the first but located in close spatial relation to said first conductor and forming a closed circuit whereby it substantially neutralizes said additional inductance of the first conductor, and inductance measuring means for measuring the effective inductance of said first conductor connected thereto.

4. Apparatus as claimed in claim 3 in which the second conductor is constituted by a metal cylinder.

5. Apparatus as claimed in claim 3 in which the second conductor is constituted by a metal cylinder coated with insulating material.

6. Apparatus as claimed in claim 3 in which the second conductor is constituted by a metal cylinder coated with insulating material and said insulating material is provided with a helical groove for the purpose of insulating adjacent turns of said first conductor from one another.

Dated this 3rd day of August, 1926.

WILBUR E. MOUGEY.